No. 882,498. PATENTED MAR. 17, 1908.
H. H. HORNSBY & E. W. ANGER, Jr.
PROTECTIVE APPLIANCE FOR ELECTRIC CIRCUITS AND APPARATUS.
APPLICATION FILED DEC. 19, 1901.
3 SHEETS—SHEET 1.
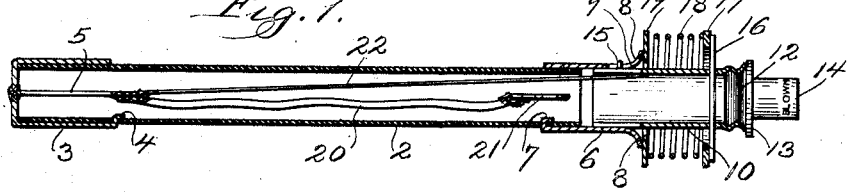
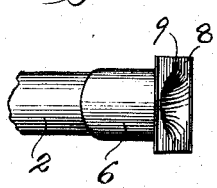 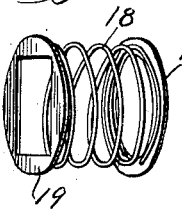 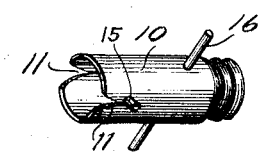 
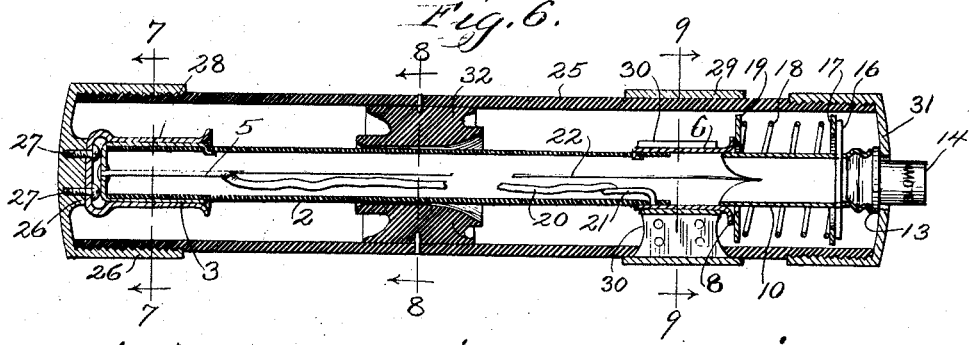
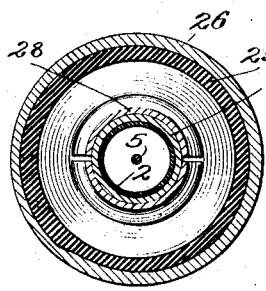 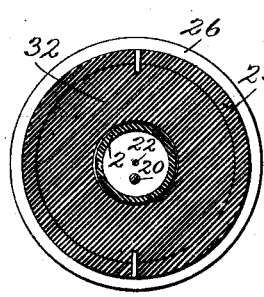 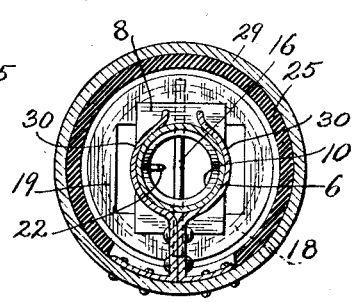
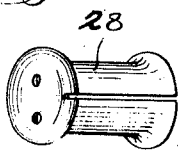
Witnesses:
R. J. Packer
Robert Lewis Ames
Inventors:
Harry H. Hornsby and
Edward W. Anger Jr.
By Jones & Addington
Attorneys.

No. 882,498. PATENTED MAR. 17, 1908.
H. H. HORNSBY & E. W. ANGER, Jr.
PROTECTIVE APPLIANCE FOR ELECTRIC CIRCUITS AND APPARATUS.
APPLICATION FILED DEC. 19, 1901.
3 SHEETS—SHEET 2.
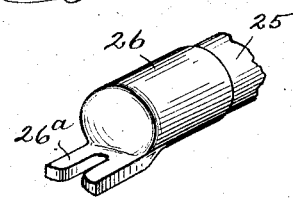
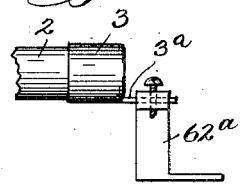
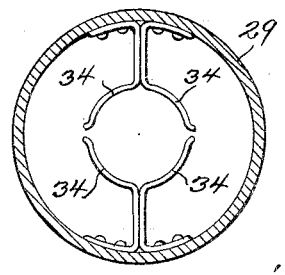
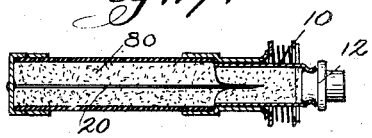
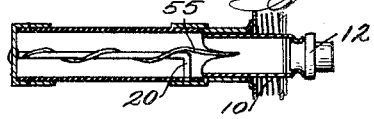
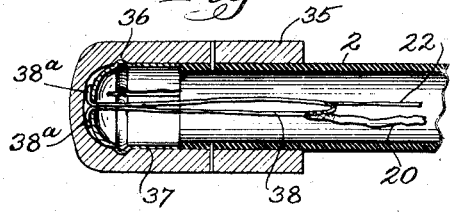
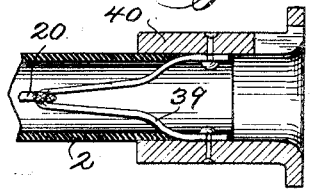
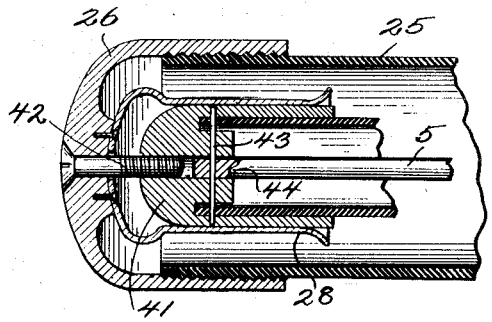
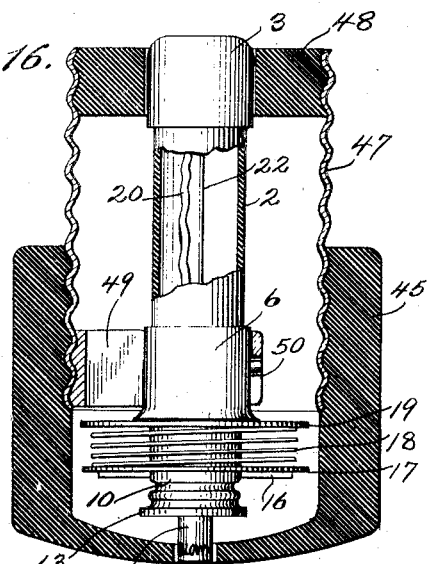
Witnesses:
R. J. Jacker
Robert Lewis Ames
Inventors:
Harry H. Hornsby and
Edward W. Anger, Jr.
By Jones & Addington
Attorneys No. 882,498. PATENTED MAR. 17, 1908.
H. H. HORNSBY & E. W. ANGER, Jr.
PROTECTIVE APPLIANCE FOR ELECTRIC CIRCUITS AND APPARATUS.
APPLICATION FILED DEC. 19, 1901.
3 SHEETS—SHEET 3.
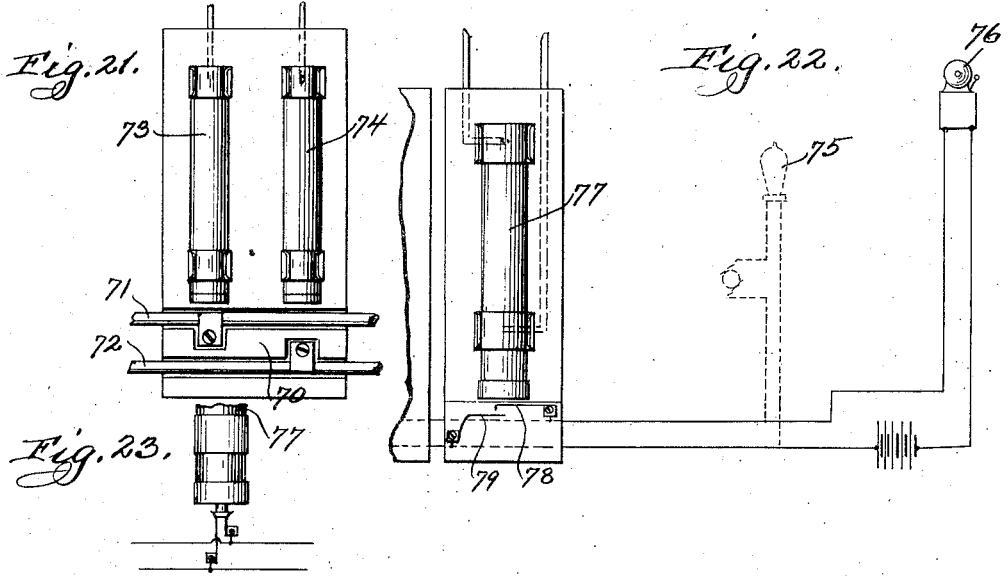
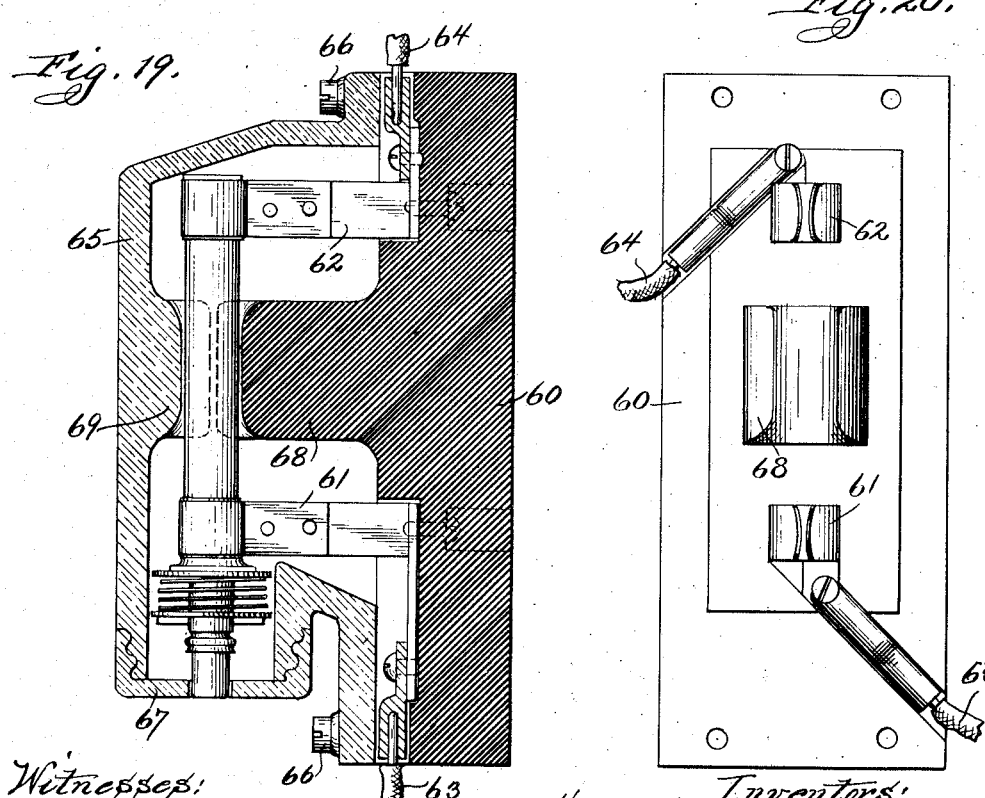

UNITED STATES PATENT OFFICE.

HARRY H. HORNSBY AND EDWARD W. ANGER, JR., OF CHICAGO, ILLINOIS.

PROTECTIVE APPLIANCE FOR ELECTRIC CIRCUITS AND APPARATUS.

No. 882,498.      Specification of Letters Patent.    Patented March 17, 1908.

Application filed December 19, 1901. Serial No. 86,506.

*To all whom it may concern:*

Be it known that we, HARRY H. HORNSBY and EDWARD W. ANGER, Jr., citizens of the United States, residing at Chicago, in the county of Cook and State of Illinois, have invented a certain new and useful Improvement in Protective Appliances for Electric Circuits and Apparatus, of which the following is a full, clear, concise, and exact description, reference being had to the accompanying drawing, forming a part of this specification.

Our invention relates to improvements in protective appliances for electric circuits and apparatus, and particularly to that class of such devices employing tubular or other coverings for the fuse wires together with signaling means to exteriorly indicate the condition of the fuse wires or links within the tubes or sheaths.

Owing to the danger of fire attending the use of the open or uncovered fuse, it was sought to inclose the fuses in tubes capable of withstanding the effects of the burning and arcing at the fuse. Such inclosed fuses however were objectionable as there was no visual indication of the destruction or "blowing" of the fuse. It was then tried to remedy this defect by providing a supplemental fuse along the outside of the inclosing fuse tube which in attempting to carry the current after the main fuse wire melted, would fuse and burn the outside of the tube so as to discolor the same and thus enable the destroyed fusewire to be readily picked out. But in thus acquiring one advantage, the object of the inclosing tube in preventing fire exterior thereto was to a large extent defeated. The next step was to inclose the supplemental fuse in the tubes, but here again the fire was transmitted to the outside, to burn or discolor the tube, etc., thus losing in a large measure the advantage sought to be gained.

It is one object of our invention to provide a device of the kind described in which all the fire due to the melting of the fuse shall be retained within the inclosing fuse tube and one in which at the same time a signal, exterior of the tube, shall be given, thus deriving at once all the advantages sought by reason of the inclosing of the fusewire or link and having none of the usual disadvantages on account of the exterior signal.

A further object is to so construct the device that the fuse link shall not be placed under a state of stress, whereby a rapid deterioration of the same is prevented and a long life thereof is secured.

Still other objects of our invention are to provide protective appliances having signals to indicate the condition of the fuse wires, where such appliances are intended for heavy current work and are necessarily of considerable initial cost. Such devices are provided with an outer casing capable of withstanding the destructive forces due to burning out of the fuse wire or link, and with an inner sheath for the fuse-wire whereby when the fuse is destroyed the said sheath and the fuse wire may be replaced at small expense. Such devices, have not heretofore been provided with signaling means to indicate the condition of the fuse and are therefore objectionable as noted above. Our invention therefore, seeks to provide a means for exteriorly indicating when the fuse within is disrupted, and to provide a device in which the same is accomplished without complication of parts, and in an efficient and inexpensive manner.

The invention also embraces special features of construction, all of which will be made clear in the description of the several embodiments thereof in the accompanying drawings, wherein the same reference letters are applied to like parts throughout, and in which:

Figure 1 is one form of the inclosed fuse or protective appliance of our invention; Figs. 2, 3, 4 and 5 are detail views of the parts thereof. Fig. 6 is a longitudinal section of the device of Fig. 1 and one form of its inclosing casing or tube. Fig. 7 is a transverse section on line 7—7, Fig. 6; Fig. 8 is a similar view on line 8—8 Fig. 6; Fig. 9 is a transverse section on the line 9—9 Fig. 6; Fig. 10 is a detail perspective view of the spring clip of the casing which is adapted to receive the inner end of the fuse tube; Fig. 11 is a view of a modified form of the end cap for the casing; Fig. 11ª shows a still different form of end cap with its contact clip; Fig. 12 illustrates a modification of the contact clips for the outer or forward end of the fuse sheath the same being adapted for heavy current work; Fig. 13 is a sectional view of a modified form of the inner or closed end of the sheath adapted for heavy current circuits; Fig. 14 is a sectional view of the opposite end of the same also adapted for heavy currents; Fig. 15 is a sectional view of a different form of the closed end of the sheath with its casing; Fig. 16 shows the invention applied to an ordinary plug fuse; Fig. 17 shows a modification of the inclosed fuse; Fig. 18 shows still another modification; Fig. 19 shows the device housed in another form of casing; Fig. 20 is a plan view of substantially the same form as in Fig. 19, but with a different way of leading the conductors into the block; Fig. 21 is a plan view of a cut out block of the double pole type with the fuses in place thereon; Fig. 22 shows how the invention may be used in connection with a signaling system; Fig. 23 shows a modification of the circuit closing springs of the signaling circuit.

Like letters indicate like parts throughout the several views.

Referring to Figs. 1 to 5 the readily removable and replaceable inclosed fuse of our device comprises the insulating pipe, tube or sheath 2, having at one end a metallic contact cap, 3, secured thereto by a prong or pin, 4, and having a terminal rod, 5, of suitable material such as copper, riveted, soldered or otherwise secured thereto and extending into the sheath. Near the other end of the sheath 2, is provided a metallic sleeve, 6, firmly affixed in position by means of a suitable prong or pin, 7. As shown in Figs. 1 and 2, the outer end of this sleeve, 6, has a flaring rectangular end 8 in which a slot 9 is formed. Within the outer end of the sleeve, 6, a cup, plunger or sleeve-like cap, 10, is adapted to fit, said cap being split or notched as at 11, Fig. 4, in the inner end to cause it to adhere to the interior of the sleeve, 6, with a slight spring pressure. While the inner end of the cap or plunger, 10, may be constructed in any manner desired, we prefer to provide a separate and readily removable plug 12 having an enlarged portion, 13, and a smaller portion 14. The end of the plug 12 opposite the portion 14, is provided with a groove or grooves, and the end of the cap is crimped as seen in Fig. 4, this crimped end engaging in the groove or grooves to firmly engage the plug, without interfering with its ready removal. This extended end 14, of the cap, as will hereafter be described, constitutes the indicating part of the protective device which is adapted to protrude, and when used in connection with a casing to project through an aperture in the same, when the fuse is blown, melted, burned out or disrupted. A short pin, 15, on the cap 10, enters the slot, 9, when the cap is in normal position, to prevent relative rotation, and a long pin, 16, extends completely through the outer end of the cap. A washer 17 having an aperture large enough to slip over the end, 8 of the sleeve, 6, is normally pressed against the pin 16 by a coil or other suitable spring, 18 which in turn bears against a second washer 19 having a rectangular opening just large enough to slip over the end 8 of sleeve, 6. These washers and the spring may be all secured together and when in place as shown in Fig. 1, the long way of the aperture in washer 19 is turned cross-wise of the end 8, so as to provide a bearing for the washer. The fuse wire or line 20 extends between the terminal 5, and a like part 21 which is in electrical contact with the contact sleeve, 6, as shown in Fig. 6. A small supplemental fuse or conducting wire, 22, extends between the terminal, 5, and the cap, 10, and is secured thereto in any desired manner so as to hold the cap, 10 in its inner position against the tension of the spring 18.

Under normal conditions the current flows between the end cap, 3, and the sleeve, 6, which are suitably connected in the electric circuit and over the fuse wire or link 20.

On account of the resistance of the supplemental or auxiliary and attenuated wire or fuse 22 and the poor contact made between cap or plunger 10 and contact sleeve, 6, very little current normally flows over these parts. But when a heavy current greater than the capacity of the fuse wire 20, passes over the circuit, the fuse-wire melts and opens the circuit, and the current then flows through the supplemental fuse or wire, 22, in sufficient quantity to immediately fuse, break or disrupt it, thus permitting spring, 18 which presses against washer, 17 and pin 16, to eject the indicator, 14. It is thus apparent that the usual objectionable fire or burning outside of the tube is avoided.

One form of inclosing casing with which the device is adapted to be used is shown in Figs. 6 to 10. Here a tube or casing, 25, of suitable insulating material is provided with a metallic end cap, 26, threading thereon and having secured thereto by screws 27 a split spring sleeve or terminal clip, 28, Fig. 10, which is adapted to receive the end contact or cap 3 of the inclosed fuse and owing to the extended surface and spring pressure to make good electrical contact therewith. Near the other end of the casing, 25, a metallic contact sleeve 29, surrounds the same, said sleeve having the inturned spring contact clips, 30, connected therewith, as shown in Fig. 9, between which clips the metallic contact sleeve, 6, of the inclosed sheath is engaged as seen in Figs. 6 and 9. The casing 25, is cut away as seen in Fig. 9 to provide room for the terminal clips, 30. A cap 31 threads upon the end of the tube, 25, and has an aperture alining with the indicating plunger 14 of the fuse tube. Under normal conditions, when the inner tube or fuse is in the position shown in Fig. 1 the indicator stands so that its end does not project beyond the end of the casing, but when the fuse wire is blown, the indicator is forced out and is thus exposed. The word "blown" may if desired be placed upon the indicator, as shown, so as to be out of sight normally and exposed only when the fuse wire is disrupted. The enlarged part 13 of the indicator engages the inside of the cap 31, to prevent the loss of the cap or plunger 10.

In order to insure the ready insertion of the end, 3, of the fuse sheath in the spring clip, 28, the guiding member, 32, preferably of insulating material, is fixedly held in the tube, 25, by suitable means and is provided with a central flaring or funnel shape bore by means of which the said fuse sheath is guided into place when being inserted, this action being assisted by the flaring mouth of the clip 28 itself. It will be understood that the casing is adapted to be connected in the electric circuit by suitable terminal clips engaging the metallic end or contact cap, 26 and contact sleeve 29. To replace a fuse after being blown, it is merely necessary to remove the cap, 31, and to withdraw the sheath 2, the latter being easily grasped by the rectangular end 8 thereof. A new tube or sheath 2 is then inserted, the same washers and spring, as well as indicator being used as before, and the cap 31, is replaced. The cost of replacing the blown fuses is thus seen to be slight, as the parts necessary to be changed are comparatively inexpensive. All danger of fire is avoided as everything is kept inside and moreover an exterior signal is obtained.

Fig. 13 shows the closed end of the tube for heavy current. The tube 2 is pinned to the heavy metallic cap 35 which has an internal groove 36 into which a sheet metal shell is pressed or spun, the terminal 38 being provided with outwardly extending ends, 38ª, located between and held by the shell 37 and cap, 35, whereby a firm mechanical connection and a good electrical contact with the metallic end of the tube is secured. The part extending into the tube may be conveniently formed into a loop as shown though other constructions and arrangements may be employed. The fuse wire or link may then be secured to the terminal 38 in any desired manner.

Fig. 14 shows the other end of the tube for heavy work. Here the terminal, 39 to which the main fuse 20 is connected is in loop or staple form with its ends riveted, soldered or otherwise suitably secured to the heavy metallic contact sleeve 40.

Fig. 15 shows an arrangement of the closed ends of the casing and the fuse tube or sheath for extremely heavy current work. The tube 25 is inclosed by the contact cap, 26 which carries as before the split spring end clip 28. The fuse sheath carries the heavy metallic end piece, 41 as shown. Alining apertures are provided through caps, 26 and 41 and a screw 42 passes through the outer end into the inner cap, whereby the latter is mechanically and electrically connected with the former. The rod, 5 to which the fuse wire is adapted to be attached is pinned in place in the end cap 41 by pin 43, and it may in addition be soldered therein and the metal of the cap may be upset thereinto as shown at 44.

In Fig. 11 the cap 26 of the casing is provided with clips, 26ª, cast integrally therewith and adapted to receive screws to secure them in position to the circuit terminals.

In Fig. 16, the invention is shown applied to the plug type of fuse. This comprises the insulating cap or casing 45 having the usual central aperture 46 and carrying the threaded shell 47 forming one terminal of the device. A similar insulating end wall or piece, 48 is provided at the other end through a central aperture in which the inclosed end of the fuse tube or sheath projects and is adapted to connect with a contact of a suitable socket. The contact sleeve, 6 of the fuse cartridge is engaged by a spring contact clip, 49 to complete the circuit to the shell 47, which in turn contacts suitably in the socket in which the plug is inserted. Otherwise the construction is the same as in Fig. 1, except that the indicator is made small enough for the usual aperture 46 of the plug cap. The operation is the same as before described so that when the fuse wire is disrupted the spring 18 forces the indicating end of the plunger 14 out of the hole in the cap, the part, 13, thereof serving to retain the plunger within the cap. A pin 50 and corresponding bayonet slot in the clip 49 are provided to prevent forcing the fuse tube out of place when the end 3 is pressed against its contact.

Fig. 17 shows a modification of the arrangement of the appliance in that the fuse wire or link 20 is itself attached to the spring plunger 10; it is obvious that this form is within the scope of certain phases of our invention. When the fuse wire is disrupted the plunger indicator is ejected by the spring and makes known the fact. Again, the supplemental fuse or conducting wire previously described may be replaced by means of other attenuated, fragile or threadlike mechanical restraining means, which is ruptured, destroyed or burned out by the blowing of the fuse wire to cause the same to release the indicator and which disruption does not depend upon the heating or fusing action of the electric circuit upon the said retaining means. One such arrangement is shown in Fig. 18 wherein 20 is the main fuse and 55 is the thread-like or other attenuated indicator retaining means. When the fuse wire blows, the said means is burned up by the heat and fire of the fusing of the fuse wire whereby it is caused to release the indicator and the same is actuated by its spring. Other forms and other methods all within the spirit of our invention are apparent, but those described are deemed sufficient for purposes of illustration.

Fig. 19 shows a different form of casing. A base, 60 of porcelain, glass or other suitable substance, is provided with terminal clips, 61 and 62 of any desired construction and are connected with suitable conductors 63 and 64. A fuse like that of Fig. 1 is adapted to be held in said terminals and the whole is covered by a cover or casing 65 held in place by suitable screws, 66, 66. A cap, 67 is threaded upon said casing and has an aperture through which the indicator projects when the fuse wire is blown. A steering means is also provided consisting of channeled projections 68 and 69 formed respectively upon the base and cover, and having a flaring opening to better guide the fuse in place.

Fig. 20 shows a similar arrangement except that the conductors 64 and 65 are led through upwardly sloping apertures into the block, whereby rain and moisture cannot penetrate to the interior of the same.

Fig. 11ª shows a modification of the contact and terminal clips adapted to be used in the device of Figs. 19 and 20. The contact band, 3, on the sheath has a longitudinally extending flat clip 3ª adapted to be inserted in a slot in the perpendicular terminal clip 62ª, a screw being passed through both the upper flexible part of said clip and the contact clip 3ª and then threading into the said terminal clip. A hole would be provided in the casing 65 to permit the insertion of a screw driver. Similar clips could be provided for the fuse tube at its lower contacts, but it is not necessary to show the same.

Fig. 21 shows a cut-out block provided with fuses of our invention, the terminal extension 70 of the block having grooves in its upper surface for the conductors 71 and 72 which are connected by means of suitable permanent connections on the block with the contact clips adapted to receive the fuses 73 and 74.

Fig. 22 shows a signaling system for these devices. It is customary to mount them upon switchboards and it is convenient that the operation of any fuse in a group or upon a particular board should operate a signal. We accordingly provide a lamp 75 or a bell 76 either of which may be used as a signal as desired, the circuit for which signal is closed by means of any fuse of a group such as is typified by fuse 77. When the indicator drops or is forced from the lower end of the casing, 77, the contacts 78 and 79 are closed together and the circuit of the lamp is closed. Any system of wiring of course may be employed, a signal for each group or for as many groups as desired being provided.

Fig. 23 shows a different way of connecting the signal circuit contacts, that is, by a metallic end or band for the indicator and two springs between which it crowds. This has the advantage of clinging or sticking in place by the frictional contact of the plunger and springs to maintain the signal circuit closed.

From the foregoing it will be apparent that the fuse tube may be used alone in certain relations, and that it is capable of use in connection with a variety of casings. The said fuse tube may or may not be filled with a suitable finely divided non-conducting material as shown at 80 in Fig. 17.

Various changes, modifications and substitutions may be made in our device without departing from the principle of the same, and we therefore hold it to include all such variations as fairly fall within its scope.

Having described our invention what we claim as new and desire to secure by Letters Patent is:

1. In a protective appliance for electric circuits and apparatus, the combination with an insulating sheath, of a fuse wire within the sheath, suitable terminals mounted upon said sheath and electrically connected with the said fuse wire, stationary contacts to receive said terminals and arranged to include the said appliance in an electric circuit, and a longitudinally movable indicating spring pressed plunger at one end of the said sheath, said plunger being normally held in non-indicating position against the tension of its spring and protruded thereby when the fuse wire is disrupted, said plunger being free from the external circuit conductors whereby its action is unimpeded thereby, substantially as described.

2. In a protective appliance for electric circuits and apparatus, the combination with an inclosed sheath of insulating material, of circuit terminals mounted upon the exterior of said sheath in proximity to the ends thereof, stationary contact devices to receive said terminals and connect the appliance in the electric circuit to be protected, a fuse wire within the sheath and in electrical connection with said terminals, and a spring plunger located in the end of the sheath normally held in nonindicating position against the tension of the spring and ejected when the fuse wire is disrupted, said plunger being free from the external conductors of the electric circuit so as not to be impeded thereby, in its movement, substantially as described.

3. In a protective appliance for electric circuits and apparatus, the combination with an inclosed fuse tube of insulating material, of metallic circuit terminals mounted upon the exterior of said tube, stationary contacts to receive said terminals and adapted to connect the appliance in the electric circuit to be protected, a fuse wire within the tube and electrically connected with said terminals, a spring plunger located in the end of the tube and secured to one end of the fuse wire, and normally held thereby against the tension of its spring in non-indicating position, whereby when the fuse is blown the plunger is released and protruded beyond the end of the sheath to indicate the blowing of the fuse, substantially as described.

4. The combination with a sheath having terminals carried thereon, of stationary contact devices to receive said terminals and connect the sheath in the electric circuit to be protected, of a spring plunger in the end of said sheath to give a signal, a fuse wire within the sheath, means independent of said fuse wire to normally retain the plunger in non-indicating position, the spring serving to eject the plunger upon the blowing of the fuse to give a signal, substantially as described.

5. In a protective appliance for electric circuits, the combination with a sheath, of a main fuse-wire therein connected in the circuit to be protected and carrying the principal portion of the electric current, a spring-pressed signal to indicate when said fuse is blown, and an auxiliary fuse-member of small electric carrying capacity for normally holding said signal against operation and arranged to be severed by the blowing of the main fuse.

6. In a protective appliance for electric circuits, the combination with a sheath, of a fuse-wire therein connected in the circuit to be protected, a movable mechanical signal normally within said sheath and arranged to be projected beyond the same to indicate when the fuse is blown, and a member of small electric carrying capacity for normally holding said signal against operation, said member being arranged to be severed by the blowing of a fuse.

7. In a protective appliance for electric circuits, the combination with a sheath, of a main fuse wire therein connected to carry the principal portion of the electric current in the circuit to be protected, a mechanical signal, a spring to actuate said signal to indicate when said fuse is blown, and an attenuated or thread-like member for normally holding said signal against operation and arranged to carry the current and be severed thereby when the fuse is blown, substantially as described.

8. In a protective appliance for electric circuits, the combination with a sheath, of a main fuse wire therein, connected in the circuit to be protected to carry the principal portion of the electric current, a slidable plunger, a spring to actuate said plunger to indicate when the fuse is blown, and an auxiliary member of small electric carrying capacity for normally holding said signal against operation and arranged to carry the current and be severed thereby when the fuse is blown.

9. In a protective appliance for electric circuits, the combination with a sheath, of a main fuse wire therein connected in the circuit to be protected to carry the principal portion of the electric current, a mechanical signal having an indicating and a non-indicating position, means tending to move said signal to its indicating position, and an auxiliary member of small electric carrying capacity to hold said signal in non-indicating position, against the action of said means, said auxiliary member being in the circuit and severed by the current when the fuse blows, whereby said signal may move to its indicating position.

10. In a protective appliance for electric circuits, the combination with a sheath, of a main fuse wire connected in the circuit to be protected to carry the principal portion of the electric current, a mechanical signal having an indicating and a non-indicating position, a spring tending to move said signal to its indicating position, and an auxiliary member of small electric carrying capacity to hold said signal in its non-indicating position against the tension of said spring, said auxiliary member being arranged in the circuit and severed by the current when the fuse blows, whereby said signal will be released.

11. In a protective device for electric circuits, the combination with a sheath, of a main fuse wire therein, connected in the circuit to be protected to carry the principal portion of the electric current, a mechanical signal also inclosed within said sheath and adapted to be extended beyond said sheath, and a member of small electric carrying capacity for normally holding said signal against operation, which is arranged in the circuit and severed by the current when the fuse blows.

12. In a protective appliance for electric circuits, the combination with a sheath, of a main fuse wire therein, connected in the circuit to be protected to carry the principal portion of the electric current, a slidable signal associated with said sheath and having an indicating and non-indicating position, a spring tending to move said signal to its indicating position, and an auxiliary member of small electric carrying capacity to hold said signal in its non-indicating position against the tension of said spring, said auxiliary member being connected in the circuit and severed by the current when the fuse blows, whereby the signal will be moved to its indicating position.

13. In a protective appliance for electric circuits, the combination with a sheath, of a main fuse wire therein, connected in the circuit to be protected to carry the principal portion of the electric current, a mechanical signal to indicate when said fuse is blown, and an auxiliary member of small electric carrying capacity for normally holding said signal against operation, said auxiliary member being suitably connected with the circuit in which said fuse is arranged, whereby when said fuse is blown, the current will traverse said auxiliary member and cause the same to be disrupted should it not previously have been severed by the blowing of the fuse.

14. In a protective appliance for electric circuits and apparatus, the combination with an outer inclosing tube having suitable connections to include the same in the electric circuit, of a removable fuse sheath within said inclosing tube, a fuse wire within the sheath, and means for giving a signal exterior to the casing when the fuse wire is blown.

15. In a protective appliance for electric circuits and apparatus, the combination with an outer tube or casing having suitable connections to include the same in the electric circuit, of a removable fuse-sheath within the casing, a fuse-wire within the sheath, and a mechanical signal exterior of said casing, and means whereby said signal is operated when the fuse-wire is blown.

16. In a protective appliance for electric circuits and apparatus, the combination with an outer casing having suitable connections to include the same in the electric circuit, of a removable fuse-sheath within the casing, a fuse-wire within the sheath, and a signal exterior to the casing and controlled from within to indicate the blowing of the fuse-wire.

17. In a protective appliance for electric circuits and apparatus, the combination with a casing having suitable connections to include the same in the electric circuit, of a fuse sheath within the casing, a fuse wire within the sheath, a plunger within the casing, and means for projecting said plunger from said casing when the fuse is blown.

18. In a protective appliance for electric circuits and apparatus, the combination with a casing having suitable connections to include the same in the electric circuit, of a fuse sheath within the casing, a fuse wire within the sheath, a spring pressed signal, means to hold said signal against the tension of its spring, said means being connected in the circuit to be disrupted by the current when the fuse is blown, substantially as described.

19. In a protective appliance for electric circuits and apparatus, the combination with a casing having a fuse sheath within said casing, of a fuse wire within said sheath, a spring pressed plunger within the casing having a part projecting therefrom, and means to restrain said plunger against the pressure of its spring to retract the projecting part thereof and adapted to be caused to release the same by the blowing of the fuse wire.

20. In a protective appliance for electric circuits and apparatus, the combination with an outer casing, of a fuse-sheath within the casing, a main fuse-wire within the sheath, a supplemental or auxiliary attenuated or thread-like member arranged in said sheath, and means controlled by said member for giving a signal when it is disrupted.

21. In a protective appliance for electric circuits and apparatus, the combination with an outer casing, of a fuse-sheath within the casing, a main fuse-wire within the sheath, a supplemental or auxiliary attenuated or thread-like member associated with said wire and also disposed within the sheath and which is disrupted by the blowing of the fuse-wire, and means controlled by said member for operating a signal upon the blowing of the wire.

22. In a protective appliance for electric circuits and apparatus, the combination with a casing provided with an aperture, of a fuse sheath within the casing having suitable connections to include the same in the electric circuit, a fuse wire within the sheath, a detachable part for said sheath, and means associated with said detachable part for projecting it through said aperture when the fuse wire is blown, substantially as described.

23. In a protective appliance for electric circuits and apparatus, the combination with a casing provided with an aperture, of a fuse sheath within the casing, a fuse wire within the sheath, a spring pressed plunger carried by the sheath, arranged to operate and project a part of said sheath through the aperture in the casing when the fuse wire is blown, substantially as described.

24. In a thermo electric cut out, in combination with the main fuse wire, an auxiliary fuse wire of small electric carrying capacity, an indicator held confined by said auxiliary conductor, a spring adapted to project the indicator upon the breaking of the auxiliary conductor.

In witness whereof, we have hereunto subscribed our names in the presence of two witnesses.

HARRY H. HORNSBY.
EDWARD W. ANGER, Jr.

Witnesses:
M. R. ROCHFORD,
ROBERT LEWIS AMES.